United States Patent
Dempsey et al.

[11] Patent Number: 5,826,048
[45] Date of Patent: Oct. 20, 1998

[54] PCI BUS WITH REDUCED NUMBER OF SIGNALS

[75] Inventors: Morgan James Dempsey; Rajeev Jayavant, both of Phoenix, Ariz.

[73] Assignee: VLSI Technology, Inc., San Jose, Calif.

[21] Appl. No.: 790,303

[22] Filed: Jan. 31, 1997

[51] Int. Cl.[6] .................................................. G06F 13/00
[52] U.S. Cl. ................................... 395/309; 395/308
[58] Field of Search .................................. 395/306, 308, 395/309, 285

[56] References Cited

U.S. PATENT DOCUMENTS

| | | | |
|---|---|---|---|
| 5,455,915 | 10/1995 | Coke | 395/293 |
| 5,644,734 | 7/1997 | Houg | 395/309 |
| 5,740,385 | 4/1998 | Hayek et al. | 395/308 |

*Primary Examiner*—Glenn A. Auve
*Attorney, Agent, or Firm*—Hickman & Martine, LLP

[57] ABSTRACT

A Mini-PCI (MPCI) interface, and associated circuits and methods are provided for connecting a Peripheral Component Interconnect (PCI) device to one or more external devices. The MPCI interface, circuits and methods provide for a substantial if not full implementation of a PCI Local Bus without requiring the standard number of pins, traces, or signals. The MPCI interface includes a PCI/MPCI bridge connected between a PCI bus and to up to eight external devices in the form of MPCI devices and linear memory devices. The PCI/MPCI bridge is capable of receiving an incoming PCI transaction and multiplexing some of its signals together to create a corresponding incoming MPCI transaction. This incoming MPCI transaction may then be passed over an MPCI bus, having fewer lines and optimally operating at a higher frequency, the external devices. The process is reversed for outgoing transactions, i.e., the MPCI transactions are de-multiplexed to create PCI transactions. Additionally, the MPCI interface may also be configured to provide for direct access to linearly addressed memory devices without adding a PCI interface to the external interface. The invention may be implemented through integrated circuitry and/or computer implemented instructions, and may be included within a personal computer.

22 Claims, 8 Drawing Sheets

CTRL-7

MPCI_7

Fig. 3e

| Pins:   | CMD_H  | CMD_L  | REQ   | INT   | RESET | ROM1   | ROM1   |
|---------|--------|--------|-------|-------|-------|--------|--------|
| CLK     | 1      | 0      | 0     | 1     | X     | X      | X      |
| SDEV    | 1      | 1      | 1     | 1     | 1     | 0      | 0      |
| CTRL_9  | 1      | 1      | 0     | 0     | 1     | 1      | 0      |
| CTRL_8  | 1      | 1      | 0     | 0     | 1     | Addr24 | Addr16 |
| CTRL_7  | FRAME  | LOCK   | 1     | 1     | 0     | Addr23 | Addr7  |
| CTRL_6  | CMD/BE | CMD/BE | 1     | 1     | 0     | Addr22 | Addr6  |
| CTRL_5  | CMD/BE | CMD/BE | 1     | 1     | 0     | Addr21 | Addr5  |
| CTRL_4  | TRDY   | DSEL   | 1     | 1     | 0     | Addr20 | Addr4  |
| CTRL_3  | IRDY   | PAR_W  | IRDY  | IRDY  | 0     | Addr19 | Addr3  |
| CTRL_2  | STOP   | PAR_R  | STOP  | STOP  | 0     | Addr18 | Addr2  |
| CTRL_1  | PERR   | SERR   | PERR  | PERR  | 0     | Addr17 | Addr1  |
| CTRL_0  | SBO    | SDONE  | SBO   | SBO   | 0     | Addr16 | Addr0  |
|         |        |        |       |       |       |        |        |
| MPCI_15 | AD_31  | AD_15  | REQ7  | INT7  | REQ7  | Addr15 | Addr15 |
| MPCI_14 | AD_30  | AD_14  | REQ6  | INT6  | REQ6  | Addr14 | Addr14 |
| MPCI_13 | AD_29  | AD_13  | REQ5  | INT5  | REQ5  | Addr13 | Addr13 |
| MPCI_12 | AD_28  | AD_12  | REQ4  | INT4  | REQ4  | Addr12 | Addr12 |
| MPCI_11 | AD_27  | AD_11  | REQ3  | INT3  | REQ3  | Addr11 | Addr11 |
| MPCI_10 | AD_26  | AD_10  | REQ2  | INT2  | REQ2  | Addr10 | Addr10 |
| MPCI_9  | AD_25  | AD_9   | REQ1  | INT1  | REQ1  | Addr9  | Addr9  |
| MPCI_8  | AD_24  | AD_8   | REQ0  | INT0  | REQ0  | Addr8  | Data8  |
| MPCI_7  | AD_23  | AD_7   | GNT7  | GNT7  | GNT7  | Addr7  | Data7  |
| MPCI_6  | AD_22  | AD_6   | GNT6  | GNT6  | GNT6  | Addr6  | Data6  |
| MPCI_5  | AD_21  | AD_5   | GNT5  | GNT5  | GNT5  | Addr5  | Data5  |
| MPCI_4  | AD_20  | AD_4   | GNT4  | GNT4  | GNT4  | Addr4  | Data4  |
| MPCI_3  | AD_19  | AD_3   | GNT3  | GNT3  | GNT3  | Addr3  | Data3  |
| MPCI_2  | AD_18  | AD_2   | GNT2  | GNT2  | GNT2  | Addr2  | Data2  |
| MPCI_1  | AD_17  | AD_1   | GNT1  | GNT1  | GNT1  | Addr1  | Data1  |
| MPCI_0  | AD_16  | AD_0   | GNT0  | GNT0  | GNT0  | Addr0  | Data 0 |

PCI BUS WITH REDUCED NUMBER OF SIGNALS

BACKGROUND

The present invention relates generally to computer systems, and more specifically to methods and apparatuses for implementing a Peripheral Component Interconnect (PCI) bus.

A typical computer system, such as a standard personal computer (PC), workstation or mainframe, utilizes one or more buses to provide a path for data, address and control signals between circuits or devices. For example, in a PC architecture a microprocessor or central processing unit (CPU) is coupled to system memory (typically DRAM) by a memory or "host" bus. The CPU may write data to the system memory and read data from the system memory through the host bus. To insure the proper operation of the host bus, the CPU's host bus interface and the system memory's host bus interface are designed to operate in accordance with a specific set of rules or standards which are typically specified in a bus interface specification.

There are usually several buses, in addition to the host bus, in a computer system. It is common for these additional buses to be dedicated to interfacing specific types of devices. As is often the case, these additional buses may specify different operational standards. This multi-bus configuration presents potential operational conflicts for transactions that pass through more than one bus. To accommodate different standards, in such a system, an interface circuit is typically provided to translate or convert the transactions that occur between buses from one format to the next. Such interface circuits are typically referred to as bridge circuits.

FIG. 1 is a block diagram of a typical computer system 10 having a multi-bus configuration. As shown, a CPU 12 is directly connected to a host bus 16, which provides a connection to a system memory 14 via a chip set 18. Note that other circuits (not shown), such as additional CPUs, memory chips, input/output circuits, etc., may also be connected to host bus 16.

Chip set 18 further connects host bus 16 to a PCI bus 20. Chip set 18 functions as a bridge circuit between host bus 16 and PCI bus 20. As such, chip set 18 acts as a PCI master, on behalf of CPU 12, which allows chip set 18 to request control of PCI bus 20 so as to enable CPU 12 to conduct (send and receive) PCI transactions with any connected PCI slave circuits via PCI bus 20. Thus, chip set 18 is configured to translate between the host bus standard and the PCI bus standard. As shown, CPU 12 may conduct transactions with PCI devices **22*a* through 22*n*, via chip set 18 and PCI bus 20. PCI devices 22*a* through 22*n*** can be but are not limited to, for example, video controller, audio controller, disk controller, SCSI bus controller, modem, a communications controller, or other like device/controller.

Also shown connected to PCI bus 20, is a PCI/ISA Bridge 24, which provides an additional interface to an ISA bus 26. ISA bus 26 can be connected to several non-PCI compliant devices such as ISA devices **30*a* through 30*n*. As shown, PCI/ISA Bridge 24 may also provide an additional interface to an X bus 28 for connecting with an X device 32. ISA devices 30*a* through 30*n*, and X device 32, may function similarly to the above listed examples for PCI devices 22*a* through 22*n***, however their standard interface matches their connecting bus's standard.

This described architecture is quite complex and leads to a number of problems. One of the problems is that some bus standards require a large number of signals. This is especially true for buses that support large system memories, or allow large amounts of data be transferred quickly between devices. In such cases, the resulting bus and the devices that interface the bus may require additional interface circuitry and additional physical connections, such as pins, lines, traces, or wires, to meet the requirements. This additional hardware, which may occupy more space, tends to increase the cost of manufacture. For example, a typical PCI bus device interface requires at least 56 unique signals to function properly. This typically equates to an integrated circuit having more than 56 input/output pins, for example some integrated PCI bridges use 70 pins for the PCI interface. As a result, additional space may be required to accommodate the input/output pins and the associated interconnections between circuits. Furthermore, each pin adds cost to the manufacture of a device.

Another problem is that additional bridges, such as PCI/ISA Bridge 24, may cause or induce significant latency delays and other operational conflicts that decrease the overall performance of PCI bus 20. For example, because a typical ISA bus specification allows for transaction latencies that are much greater in duration then those allowed over PCI bus 20, PCI bus 20 can essentially be "hung-up" while waiting for a transaction via ISA bus 26 to be completed. This operational conflict/incompatibility between these buses may significantly reduce the effectiveness of computer system 10. Some bridge circuits are designed to mitigate certain types of conflicts by including additional circuitry, such as arbitration, buffering, and preemption circuits, however such additions tend to be expensive and are not always effective. Another problem is connecting non-PCI devices to a PCI bus in a cost effective manner. Adding additional bridge circuits or interfaces to connect non-PCI devices is expensive and can reduce the effectiveness of the bus implementation in some devices.

In view of the foregoing, what is desired are methods and apparatus for interfacing PCI devices, and possibly non-PCI devices, with a PCI compliant bus having a reduced number of pins/signals.

SUMMARY

The present invention relates to, in one embodiment, a Mini-PCI (MPCI) interface for connecting a PCI bus to one or more external devices. The external devices can include MPCI devices, PCI devices and non-PCI devices such as linear memory addressed devices. The MPCI interface allows substantial implementation of a PCI Local Bus Specification while requiring fewer pins/signals.

In accordance with one embodiment of the present invention there is provided an apparatus, such as a computer system, that includes a processor (e.g., a CPU), a first bus (e.g., a PCI bus), a first bridge (e.g., a PCI/MPCI bridge), a second bus (e.g., a MPCI bus), and an external device. In one embodiment, the CPU and PCI/MPCI bridge are configured to conduct transactions, such as PCI transactions, with one another over the PCI bus. To accomplish this, the PCI/MPCI bridge provides further access to the MPCI bus to which it is also connected, and subsequently to any external device(s) connected to the MPCI bus. The PCI/MPCI bridge is further configured to convert an incoming transaction as received via the PCI bus into an incoming MPCI transaction by time-division multiplexing two or more incoming PCI signals within the incoming PCI transaction into a single incoming MPCI signal.

Similarly, the PCI/MPCI bridge can convert an outgoing MPCI transaction as received via the MPCI bus into an outgoing PCI transaction by de-multiplexing at least one outgoing MPCI signal within the outgoing MPCI transaction into two or more outgoing PCI signals. As referred to herein, the incoming and outgoing PCI transactions can include a plurality of PCI signals, such as control, and address/data signals.

In accordance with one embodiment of the present invention, the PCI/MPCI bridge can include a PCI-to-PCI bridge circuit and a multiplexing/de-multiplexing stage which are configured to convert the PCI transactions into corresponding MPCI transactions by time-division multiplexing two or more PCI signals into one MPCI signal. Similarly, the PCI-to-PCI bridge and multiplexing/de-multiplexing stage can be configured to convert MPCI transactions into PCI transactions by time-division de-multiplexing one or more MPCI transactions to regenerate and form a corresponding PCI transaction. The multiplexing/de-multiplexing stage can further include one or more buffers or registers configured to receive and buffer or otherwise temporarily store one or more of the PCI and/or MPCI signals.

In accordance with one embodiment of the present invention, a circuit is provided for coupling one or more external devices to a PCI bus. The circuit includes a PCI-to-PCI bridge that can be coupled to the PCI bus and configured to send and receive PCI transactions over the PCI bus, and a multiplexing/de-multiplexing stage that is coupled to the PCI-to-PCI bridge and configured to convert at least one PCI transaction into at least one corresponding MPCI transaction by time-division multiplexing two or more of the PCI signals into at least one MPCI signal and to convert one or more MPCI transactions into at least one corresponding PCI transaction by time-division de-multiplexing one or more of the MPCI signals to re-generate the two or more PCI signals. The multiplexing/de-multiplexing stage is further capable of being coupled to one or more external devices so as to receive MPCI transactions therefrom and send MPCI transactions thereto.

In accordance with one embodiment of the present invention, a method for coupling a PCI bus to one or more external devices is provided. The method can include receiving a PCI transaction from the PCI bus, time-division multiplexing at least two of the PCI signals to generate at least one corresponding MPCI signal, time-division de-multiplexing the MPCI signal to re-generate the two PCI signals, and providing the re-generated PCI signals to the one or more external devices. The multiplexing and de-multiplexing, or conversion processes can be controlled via one or more of the PCI and/or MPCI signals and can further include temporarily storing the signals.

Thus, the present invention, whether embodied in an apparatus or in a method, effectively reduces the number of signals required in implementing a PCI compliant interface by multiplexing and subsequently de-multiplexing signals. Additionally, the present invention can be used to interface non-PCI devices and bus, and can be adapted or modified to reduce the number of pins/signals associated with these devices and buses. Furthermore, the various embodiments of the present invention are highly adaptable to differing applications because they can be implemented through conventional circuitry and/or computer implemented instructions.

BRIEF DESCRIPTION OF THE DRAWINGS

The invention, together with further objects and advantages thereof, may best be understood by reference to the following description taken in conjunction with the accompanying drawings in which:

FIG. 4b is a representational timeline graph illustrating the multiplexing of a PCI transaction into a MPCI transaction, in accordance the table in FIG. 4a;

FIGS. 6a and 6b are block diagrams illustrating the interface between an MPCI bus and a linear addressed device, in accordance with two different embodiments of the present invention, wherein FIG. 6a depicts a 25-Bit linearly addressed memory device and FIG. 6b depicts a 17-Bit linearly addressed memory device.

DESCRIPTION

An invention is described for apparatuses and methods for interfacing one or more Peripheral Component Interconnect (PCI) devices and non-PCI devices, with a PCI bus, wherein the apparatuses and methods reduce the number of pins and signals associated with standard PCI Local Bus Specification 2.1.

In accordance with one embodiment of the present invention there is provided a Mini-PCI (MPCI) interface that supports PCI compliant inputs and outputs with a reduced number of pins/signals. The MPCI interface can be used to couple a PCI bus to one or more external devices. The external devices can include specifically designed MPCI devices, PCI compliant devices or even linear addressed devices, such as a read only memory (ROM), or like device. The MPCI interface basically reduces the number of pins/signals required to complete a PCI transaction by providing a time-division multiplexed signaling scheme that can be controlled via one or more selected signals within the original PCI transaction.

Figure 1:
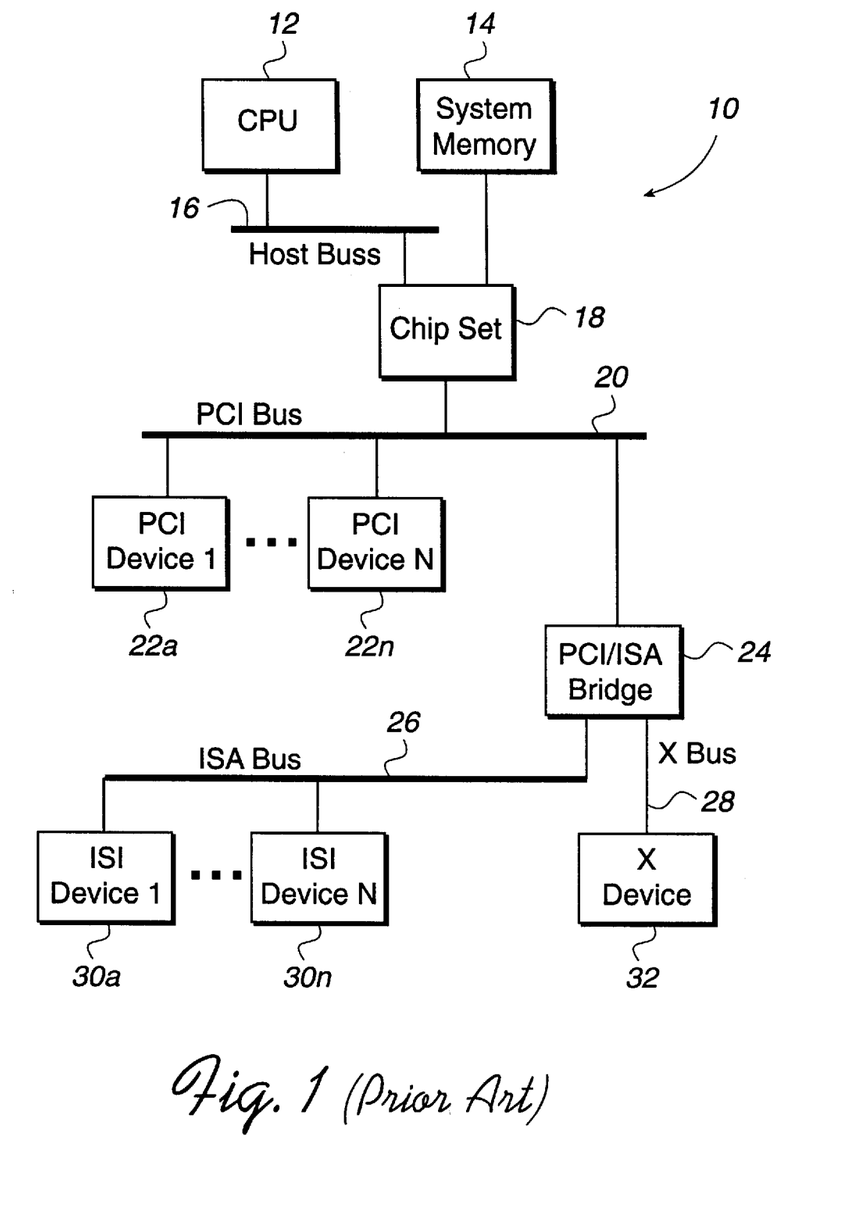
FIG. 1 is a block diagram of a typical prior art computer system having a PCI Local Bus.
Figure 2:
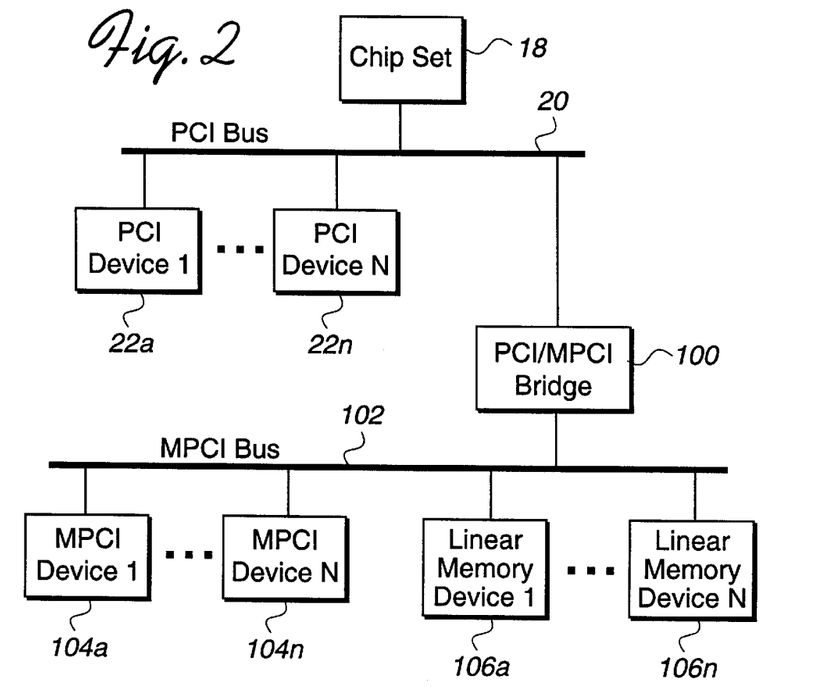
FIG. 2 is a block diagram of one embodiment, in accordance with the present invention, of a PCI/MPCI Bridge coupled to a PCI Local bus and a Mini-PCI (MPCI) bus which is further coupled to a plurality of MPCI and linear memory devices.

An embodiment of an MPCI interface is illustrated in FIG. 2. The MPCI interface includes a PCI/MPCI bridge 100, a MPCI bus 102, and one or more MPCI devices 104a through 104n or (optionally) linear memory devices 106a through 106n. As illustrated in FIG. 2, PCI/MPCI bridge 100 and MPCI bus 102 can include digital and analog electronic circuitry, and any related computer implemented instructions, required to couple PCI bus 20 to one or more external devices, such as MPCI devices 104a–n and linear memory devices 106a–n, in accordance with the present invention.

As shown, PCI/MPCI bridge 100 is coupled to PCI bus 20. While it is preferred that PCI/MPCI bridge 100 and PCI bus 20 be substantially compliant with current standards, such as PCI Local Bus Specification 2.1, it is nonetheless contemplated that non-PCI compliant implementations can benefit from the present invention and thus such embodiments are not beyond the scope of the present invention. Additionally, in other embodiments of the present invention the MPCI interface can be made to conform to other bus specifications.

PCI/MPCI bridge 100 basically provides a bridge between PCI bus 20 and MPCI bus 102. For incoming PCI transactions (e.g., those generated by CPU 12 and destined for external MPCI device 104a), PCI/MPCI bridge 100 interfaces with PCI bus 20, receives the incoming PCI signals from PCI bus 20 and generates one or more corresponding time-division multiplexed incoming MPCI signals to form MPCI transactions which are then supplied to MPCI bus 102. Similarly, for outgoing PCI transactions (e.g., those generated by external MPCI device 104a and destined for CPU 12), PCI/MPCI bridge 100 is further capable of receiving one or more outgoing MPCI signals in the form of MPCI transactions and converting them into one or more corresponding outgoing PCI transactions which are then supplied to PCI bus 20. Optionally, PCI/MPCI Bridge 100 can further provide a bridge between PCI bus 20 and linear memory devices 106a–n by addressing and controlling linear memory devices 106a–n via specific MPCI signals. These interfaces and devices will be discussed in further detail below.

As illustrated in FIG. 2, MPCI bus 102 is coupled to PCI/MPCI bridge 100, MPCI devices 104a–n and linear memory devices 106a–n. MPCI bus 204 is a multi-conductor path suitable for transporting electrical signals, such as metallic or semiconductor paths, lines, vias, traces, or wires. MPCI bus 102 basically transports incoming and outgoing MPCI signals between PCI/MPCI bridge 100 and one or more of MPCI devices 104a–n and/or linear memory devices 106a–n. MPCI bus 102 has significantly fewer pins/signals than does PCI bus 20 due to the time-division multiplexed conversion scheme associated with the present invention.

Figure 3A:
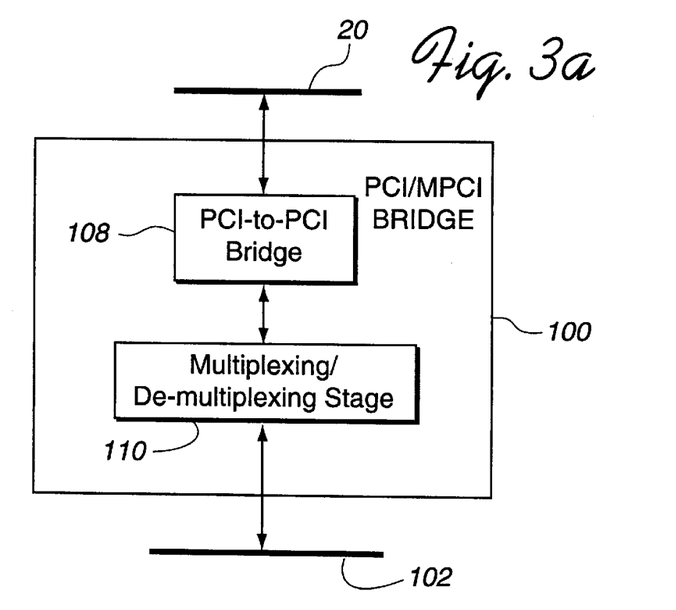
FIG. 3a is a block diagram, in accordance with one embodiment of the present invention, of a PCI/MPCI Bridge, as in FIG. 2, having a PCI-to-PCI bridge and a multiplexing/de-multiplexing stage.

FIG. 3a illustrates one embodiment of PCI/MPCI bridge 100 including a PCI-to-PCI bridge 108 and a multiplexing/de-multiplexing stage 110. PCI-to-PCI bridge 108 is coupled to PCI bus 20 and to multiplexing/de-multiplexing stage 110.

PCI-to-PCI bridge 108 represents a PCI compliant or substantially PCI compliant bridge as described in the PCI to PCI Bridge Specification available from the PCI Special Interest Group, in Hillsboro, Oreg. The PCI to PCI Bridge Specification Revision 1.0 establishes the minimum behavioral requirements are established for PCI to PCI bridges to be compliant with the PCI Local Bus Specification. As such, the PCI to PCI Bridge Specification, above, and the following additional publications which are available from the PCI Special Interest Group are each included herein by reference: PCI Specification Revision 2.1 (which contains the formal specifications of the protocol, electrical, and mechanical features of the PCI Local Bus); PCI BIOS Specification Revision 2.1 (which describes the software interface presented by the PCI BIOS functions); PCI Multimedia Design Guide Revision 1.0 (which describes the implementation of PCI multimedia components and systems); and, PCI Mobile Design Guide Revision 1.0 (which can be used in designing a PCI-based mobile system or component which works within the context of industry standard power management architectures and which complies with the requirements of the PCI Specification).

Multiplexing/de-multiplexing stage 110 is coupled to PCI-to-PCI bridge 108 and MPCI bus 102. Multiplexing/de-multiplexing stage 110 converts incoming PCI signals and transactions into incoming MPCI signals and transactions by time-division multiplexing two or more incoming PCI signals to form at least one incoming MPCI signal. Multiplexing/de-multiplexing stage 110 also converts outgoing MPCI signals and transactions into outgoing PCI signals and transactions by time-division de-multiplexing at least one outgoing MPCI signal to form at two or more outgoing PCI signals. Multiplexing/de-multiplexing stage 110 can also be configured to buffer or otherwise store the information related to the incoming or outgoing signals so as to account for or accommodate any potential latency and time-domain related differences that arise as a result of operational differences between PCI bus 20 and MPCI bus 102, or between the devices connected thereto.

Figure 3B:
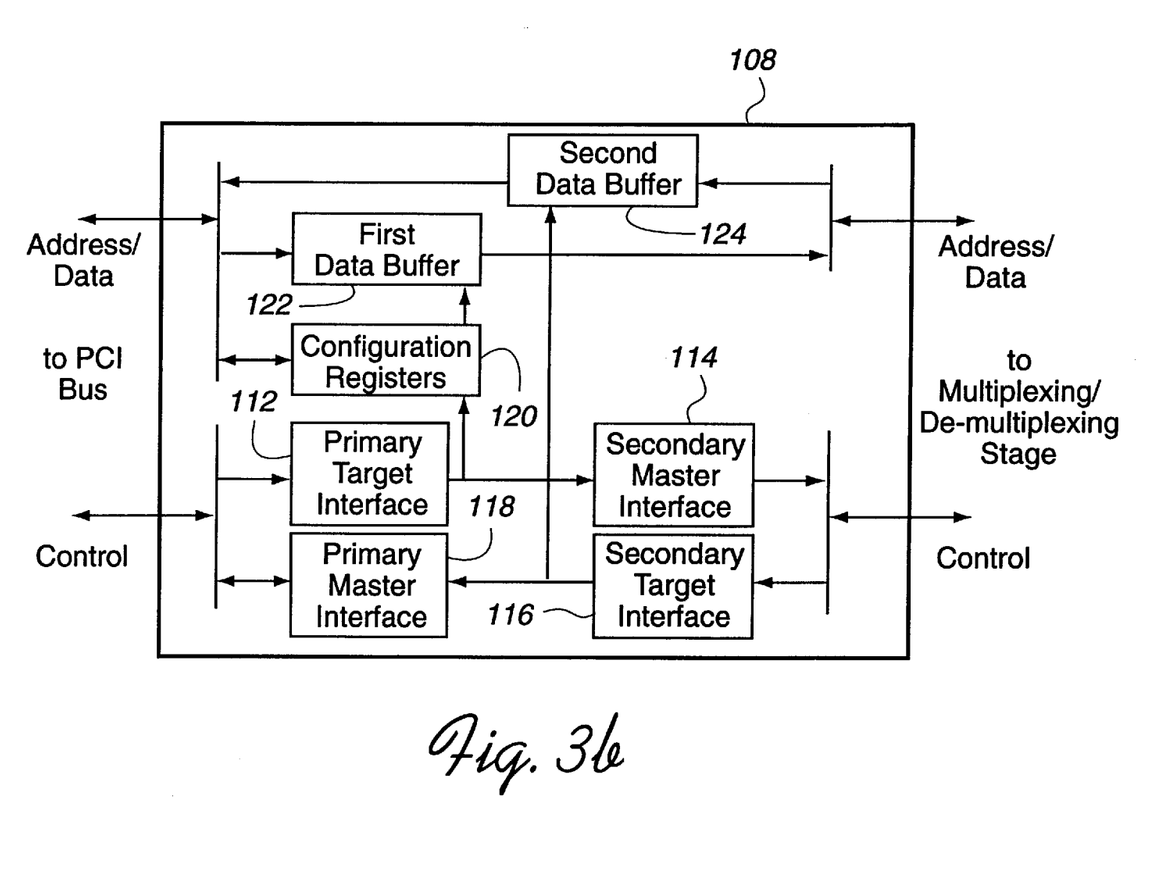
FIG. 3b is a block diagram of a PCI-to-PCI bridge, as in FIG. 3a, in accordance with one embodiment of the present invention.

FIG. 3b is a block diagram of PCI-to-PCI bridge 108, as in FIG. 3a, in accordance with one embodiment of the present invention and the PCI to PCI Bridge Specification, discussed above. As shown, PCI-to-PCI bridge 108 includes a primary target interface 112, a secondary master interface 114, a secondary target interface 116, a primary master interface 118, one or more configuration registers 120, an optional first data buffer 122, and an optional second data buffer 124. Primary target interface 112 is coupled to receive control signals from PCI bus 20 and configured to provide access to MPCI bus 102 via secondary master interface 114 and multiplexing/de-multiplexing stage 110. Similarly, secondary target interface 116 is coupled to receive control signals from MPCI bus 102 via multiplexing/de-multiplexing stage 110 and configured to provide access to PCI bus 20 via primary master interface 118. Those skilled in the art will be familiar with the master/slave processes associated with the PCI bus configuration and the various implementations thereof.

First data buffer 122 is coupled to receive incoming PCI signals (e.g., data/address signals) from PCI bus 20 and to supply these incoming PCI signals to MPCI bus 102 via multiplexing/de-multiplexing stage 110. As shown, first data buffer 318 is coupled to, and configured by, one or more configuration registers 120 that hold configuration data relating to the master and/or target devices, such as information relating to the types and attributes of the various devices and other buses that are accessible via PCI bus 20 and MPCI bus 102. Second data buffer 124 is likewise coupled to receive outgoing PCI signals (e.g., data/address signals) from MPCI bus 102 via multiplexing/de-multiplexing stage 110 and to supply these outgoing PCI signals to PCI bus 20. Second data buffer 124 can also be configured via control signals depending upon the types and attributes associated with the devices and other buses that are on the PCI bus 20 and MPCI bus 102. As such, the first and second data buffers basically hold data/address signaling information to accommodate differences in timing latencies to prevent holding off either PCI bus 20, or MPCI bus 102 during an incoming or outgoing transaction.

Figure 3C:
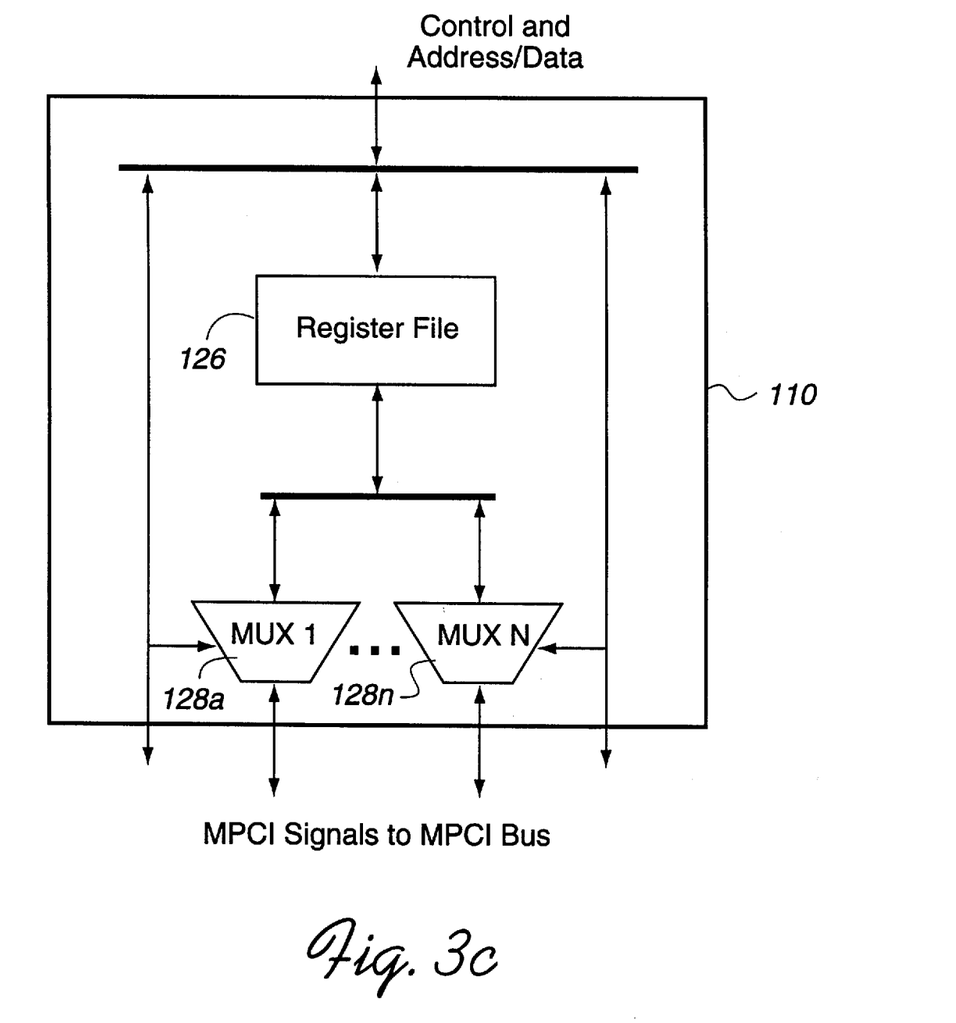
FIGS. 3c is a block diagram a multiplexing/de-multiplexing stage, as in FIG. 3a, in accordance with one embodiment of the present invention.

FIG. 3c is a block diagram illustrating one embodiment of a multiplexing/de-multiplexing stage 110, as in FIG. 3a, having a register file 126, and one or more multiplexers/de-multiplexers 128a–128n. Register file 126 is coupled to send/receive a plurality of PCI signals to/from PCI-to-PCI bridge 108, and to send/receive a plurality of PCI signals to/from multiplexers/de-multiplexers 128a–n. Register file 126 buffers or otherwise stores the information related to the various PCI signals and can be controlled by one or more of the PCI signals. Multiplexers/de-multiplexers 128a–n can also be controlled by one or more of the PCI signals to selectively output specific PCI signals as MPCI signals depending upon the controlling PCI signals. Similarly, multiplexers/de-multiplexers 128a–n can be controlled to selectively output specific MPCI signals received from MPCI bus 102 to PCI-to-PCI bridge 108.

While shown as having combined multiplexers/de-multiplexers 128 a–n in FIG. 3c, it is recognized that multiplexers/de-multiplexers 128a–n can include separate multiplexing and de-multiplexing circuits. Furthermore, it is recognized that register file 126 can also include separate incoming and outgoing register circuits. Note also that FIG. 3c shows that some of the plurality of incoming PCI signals can be routed directly from register file 126 to MPCI bus 102 without being time-division multiplexed. Likewise, some of the plurality of outgoing PCI signals from MPCI bus 102 can be applied to register file 126 and eventually to PCI bus 20 without being de-multiplexed. In other words, there can be signals that are common to both the PCI bus and MPCI bus such as, e.g., the controlling signals that define the multiplexing/de-multiplexing scheme.

Figure 3D:
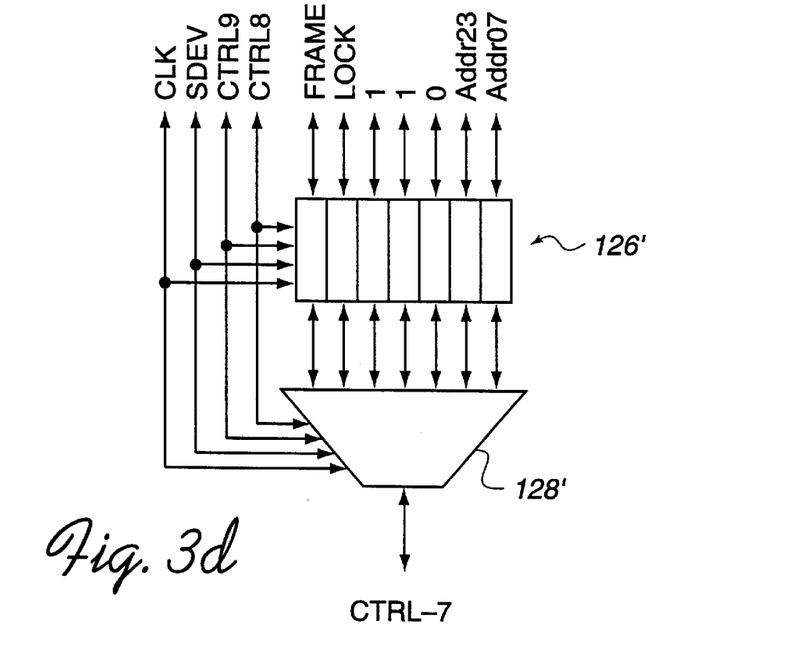
FIGS. 3d and 3e are representative schematics of a portion of the multiplexing/de-multiplexing stage as depicted in FIG. 3c, in accordance with one embodiment of the present invention.
Figure 3E:
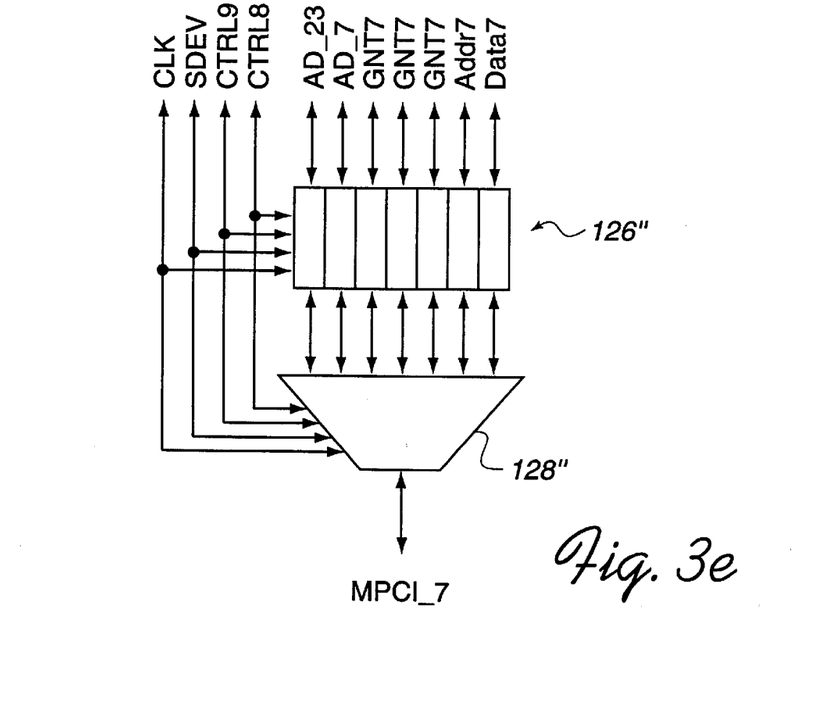

FIG. 3d is a partial schematic of a multiplexing/de-multiplexing stage 110' having a register file 126' and a multiplexer 128'. As shown, multiplexing/de-multiplexing stage 110' converts between a plurality of PCI signals (i.e., FRAME. Lock, Addr23, and Addr7 signals) and one MPCI signal (i.e., CTRL__7) based upon the status of four controlling signals (i.e., CLK, SDEV, CTRL__9 and CTRL__8 signals). Similarly, FIG. 3e is a partial schematic of a multiplexing/de-multiplexing stage 110" having a register file 126" and a multiplexer 128". As shown, multiplexing/de-multiplexing stage 110" converts between a plurality of PCI signals (i.e., AD__23, AD__7, GNT7, Addr7, and Data7 signals) and one MPCI signal (i.e., MPCI__7) based upon the status of four controlling PCI signals (i.e., CLK, SDEV, CTRL__9 and CTRL__8 signals). To better illustrate the configuration and operation of multiplexing/de-multiplexing stages 110, 110', and 110" an embodiment of the preferred PCI/MPCI conversion scheme will now be presented.

As discussed above, converting PCI transactions into MPCI transactions (and vice versa) can be accomplished by using one or more of the PCI or MPCI signals to specify a desired conversion scheme, or MPCI cycle. In the preferred embodiment of the MPCI interface, four of the common PCI and MPCI signals are used to specify one of seven unique MPCI cycles that comprise the conversion scheme. As will be shown below, the first five MPCI cycles are used to map PCI signals to MPCI pins/signals and to handle the requesting and granting of access to the MPCI and PCI buses to master devices. The remaining two MPCI cycles, which are optional, can be used to interface directly with linear addressed devices.

Figure 4A:
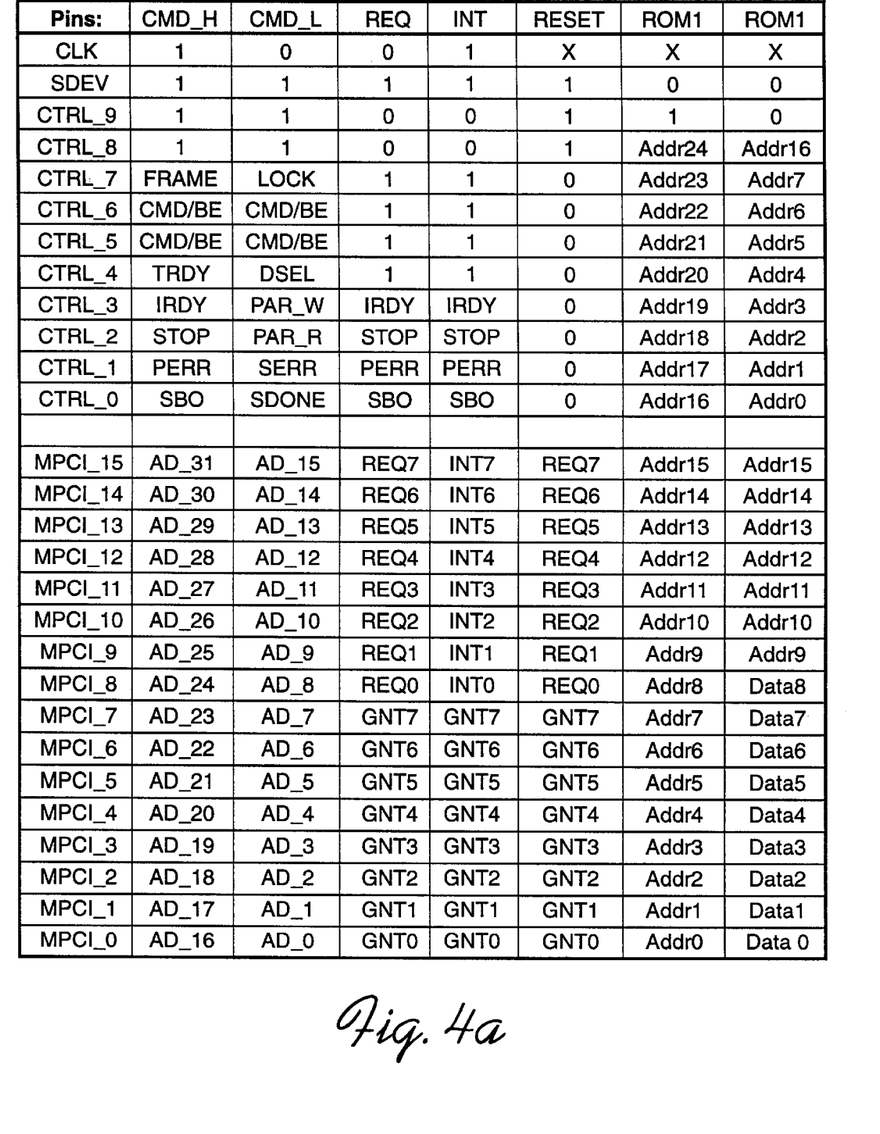
FIG. 4a is a table showing a conversion scheme for converting between PCI and MPCI transactions within a PCI/MPCI bridge, in accordance with one embodiment of the present invention.

FIG. 4a is a table that lists the seven MPCI cycles and the associated pin/signal configurations for the control, addressing and data signals of an incoming or outgoing MPCI transaction. The first column in FIG. 4a lists the names of MPCI signals, of which the first four, i.e., CLK, SDEV, CTRL__9, and CTRL__8, are the controlling signals that are used to specify the MPCI cycle. The remaining columns define the pin/signal mapping associated with the MPCI cycles, i.e., CMD__H, CMD__L, REQ, INT, RESET, ROM1 and ROM2.

In the CMD__H cycle, the upper half of the PCI address/data signals and one half of the control signals required for a PCI transaction are mapped to MPCI pins/signals. In the CMD__L cycle, the lower half of the PCI address/data signals and remaining one half of the control signals required for a PCI transaction are mapped to MPCI pins/signals. In the REQ cycle, the MPCI transaction includes eight request and eight grant signals and related control signals that can be used by up to eight different external devices that are capable of accessing the MPCI and PCI BUS (i.e., master devices). As such, the REQ cycle is also the idle state for the MPCI interface because the PCI/MPCI bridge will be looking for a request from a master device whenever the bus is idle. The INT cycle is used when polling the connected devices for interrupts for use in determining access to the bus and devices. The RESET cycle, which is similar to the REQ cycle, occurs during initialization and resetting of the MPCI interface. The ROM1 cycle is used to address a 25-bit linearly addressed memory device that has a separate data bus. The ROM2 cycle is used to access a 17-bit linearly addressed memory device while also providing eight MPCI pins/signals to carry data.

By way of example, in the CMD__H cycle, MPCI pin/signal CTRL__7 is assigned the PCI FRAME signal, and MPCI__7 is assigned the PCI AD__23 signal. This mapping of FRAME-to- CTRL__7 and AD__23-to-MPCI__7 can be further seen in the partial schematics in FIGS. 3d and 3e, respectively, wherein the four controlling signals are provided to the register files and multiplexers/de-multiplexers. Similarly, in the CMD__L cycle the multiplexing/de-multiplexing stage in FIG. 3d will map the PCI LOCK signal to CTRL__7, and the multiplexing/de-multiplexing stage in FIG. 3e will map the PCI AD__7 signal to MPCI__7. In the REQ cycle, the multiplexing/de-multiplexing stage in FIG. 3d will supply a logical high or "1" to CTRL__7 and the multiplexing/de-multiplexing stage in FIG. 3e will map the PCI GNT7 signal to MPCI__7, in the INT cycle, the multiplexing/de-multiplexing stage in FIG. 3d will supply a logical high or "1" to CTRL__7 and the multiplexing/de-multiplexing stage in FIG. 3e will map the PCI GNT7 signal to MPCI__7, and in a RESET cycle the multiplexing/de-multiplexing stage in FIG. 3d will supply a logical low or "0" to CTRL__7 and the multiplexing/de-multiplexing stage in FIG. 3e will map the PCI GNT7 signal to MPCI__7.

Figure 4B:
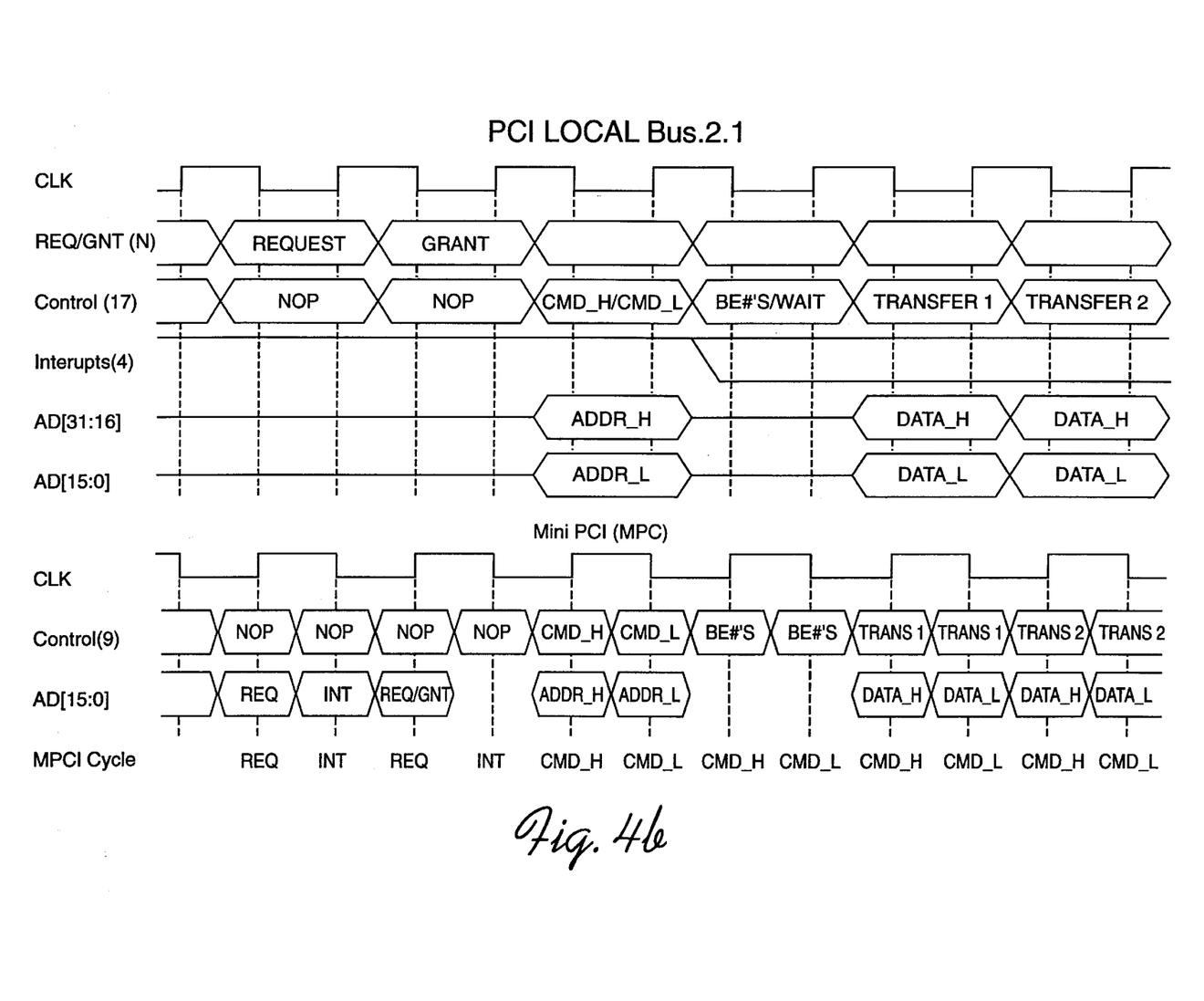

FIG. 4b is an illustrative timeline that shows a PCI transaction and a corresponding MPCI transaction and the various MPCI cycles that can occur in accordance with the table in FIG. 4a. As shown, the time-division multiplexing associated with the present invention effectively reduces the number of required pins/signals when compared to the PCI formatted transaction. In addition, it is contemplated that the MPCI interface can be operated under a different clock domain, for example, a clock that is two times or more faster than the PCI clock so as to reduce/minimize potential delays.

FIG. 4b includes a representative PCI transaction that includes a clock signal (e.g., CLK), a request and grant signal (e.g., REQ/GNT) for "N" number of master devices on the PCI bus, a plurality of control signals (e.g., 17), one or more interrupt signals (e.g., 4) and a plurality of address/data signals (e.g., address/data high signals AD16 through AD31, and address/data low signals AD0 through AD 15). As with the PCI signals in FIG. 4a, the purpose and function of these PCI signals are well known to those skilled in the art and are defined and presented in greater detail in the above mentioned and incorporated PCI documents. As depicted, a request transaction from a PCI master device is shown as occurring over the REQ/GNT lines while at the same time the control and address/data lines are idle (e.g. NOP). In accordance with the PCI specification, a grant transaction occurs following the request transaction. The grant transaction provides the go-ahead to the requesting master device to access the PCI bus. Once granted mastership of the PCI bus, the master device may send and receive additional PCI transactions over the PCI bus, these transactions can include, for example, additional control signals, interrupt signals and address/data signals. As shown, several control signals (e.g., CMD_H/CMD_L, and Byte Enables (BE#'s)/WAIT) can be sent/received during follow-on transfers during which the address/data signals are used to complete the desired transaction or process.

In the lower portion of FIG. 4b, the equivalent MPCI transaction is shown. Notice that the number of control and address/data signals are significantly reduced due to the multiplexing of the control signals and address/data signals in accordance with the conversion scheme in FIG. 4a. As shown, the initial and follow-on PCI transactions occur at about the same time on the MPCI bus, however the resulting MPCI transactions occur over shortened durations. The corresponding MPCI cycles, e.g., as shown in FIG. 4a, are shown at the bottom of FIG. 4b. The MPCI cycles reflect the operation of the MPCI interface and establish the mapping of PCI signals to MPCI signals in accordance with the selected conversion scheme. Those skilled in the art will recognize that the MPCI bus can be operated at a faster rate by way of a separate clock or by using the rising and falling edges of the existing PCI clock signal. As shown, the MPCI transactions occur over shortened durations by using the rising and falling edges of an inverted CLK signal.

Figure 5:
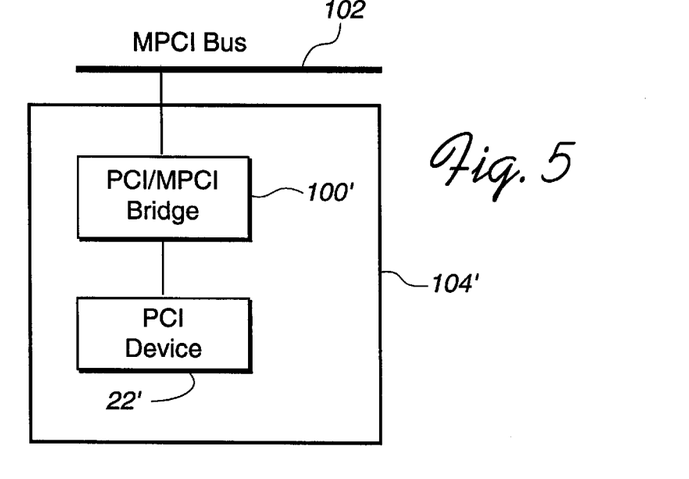
FIG. 5 is a block diagram illustrating a MPCI device that includes a PCI device and a PCI/MPCI bridge, in accordance with one embodiment of the present invention.

FIG. 5 is a block diagram of an MPCI device 104' that includes a PCI device 22' that is coupled to an PCI/MPCI bridge 100'. Basically, with this configuration, PCI device 22' interfaces with the PCI-to-PCI bridge within the PCI/MPCI bridge, and the multiplexing/de-multiplexing stage within the PCI/MPCI bridge interfaces with MPCI bus 102 to provide access to the MPCI bus 102 and with PCI bus 20 via another PCI/MPCI bridge 100 as shown in FIG. 2, for example.

Figure 6A:
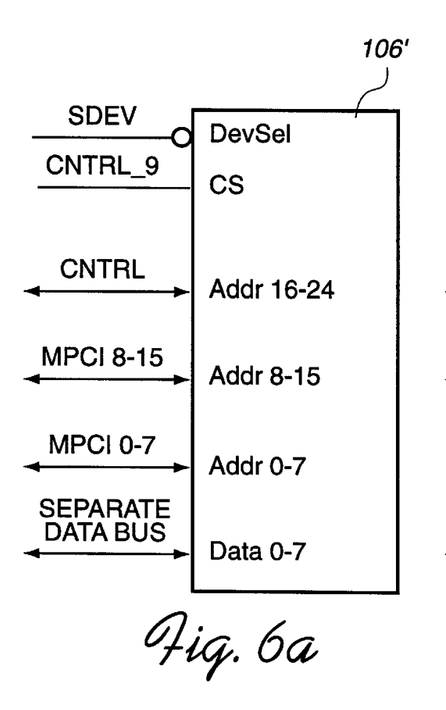

FIG. 6a is a block diagram that illustrates the interface between MPCI bus 102 and a 25-bit linearly addressed memory device 106'. As shown, the SDEV and CTRL_9 signals are connected to the DEV SEL and CS pins, CTRL_0 through CTRL_8 are connected to Addr pins 16 through 24, MPCI_8 through MPCI_15 are connected to Addr pins 8 through 15, and MPCI_0 through MPCI_7 are connected to Addr pins 0 through 7. The data signals for this embodiment are provided by way of a separate appropriately sized data bus, such as, e.g., an 8-bit data bus that is connected to the data 0 through data 7 pins of linearly addressed memory device 106'. During initialization, the PCI/MPCI bridge will determine the presence of any linearly addressed memory devices and their assigned addresses and provide such information to one or more PCI masters. When a linearly addressed memory device is to be accessed, the MPCI interface will enter into a ROM cycle during which MPCI signals will direct the reading of the linearly addressed memory device in accordance with the related PCI transactions. As such, the MPCI interface essentially provides a front-end to the linearly addressed memory device without requiring any additional bridges or interfaces.

Figure 6B:
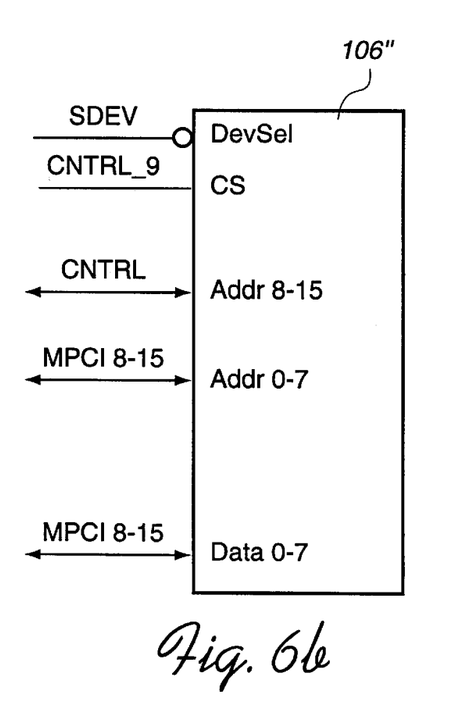

Similarly, FIG. 6b illustrates another embodiment of an interface between MPCI bus 102 and a linearly addressed device in the form of a 17-bit linearly addressed memory device 106" that is connected to MPCI bus 102, however notice that in this embodiment there are address signals. By reducing the number address signals from MPCI bus 102, the remaining MPCI signals can be used to form a data bus. For example, an 8-bit data bus can be formed by combining MPCI_0 through MPCI_7 signals. Thus, 17-bit linearly addressed memory device 106" eliminates the need to have a separate data bus as in FIG. 6a. Those skilled in the art will recognize that other configurations of address and data signals can also be supported to interface with a given linearly addressed memory device.

While the present invention has been described in terms of a preferred circuit based embodiment of the preferred method steps, there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. An apparatus comprising:

a CPU;

a PCI bus coupled to said CPU;

a first PCI/MPCI bridge coupled to said PCI bus and configured to be accessed by said CPU via said PCI bus;

a MPCI bus coupled to said first PCI/MPCI bridge; and an external device coupled to said MPCI bus and configured to be accessed by said first PCI/MPCI bridge via said MPCI bus, wherein said first PCI/MPCI bridge is further configured to convert an incoming PCI transaction as received via said PCI bus into an incoming MPCI transaction by time-division multiplexing two or more incoming PCI signals within said incoming PCI transaction into a single incoming MPCI signal, and converting an outgoing MPCI transaction as received via said MPCI bus into an outgoing PCI transaction by de-multiplexing at least one outgoing MPCI signal within said outgoing MPCI transaction into two or more outgoing PCI signals, and wherein said incoming PCI transaction includes a plurality of incoming PCI signals and said outgoing PCI transaction includes a plurality of outgoing PCI signals which are selected from a group consisting of control signals, address signals and data signals.

2. The apparatus as recited in claim 1 wherein said first PCI/MPCI bridge further comprises:

a PCI-to-PCI bridge circuit coupled to said PCI bus and configured to receive said incoming PCI transaction via said PCI bus; and a multiplexing/de-multiplexing stage coupled to said PCI-to-PCI bridge circuit and said MPCI bus, wherein said multiplexing/de-multiplexing stage is configured to convert said incoming PCI transaction as received from said PCI-to-PCI bridge circuit into said incoming MPCI transaction by time-division multiplexing two or more of said plurality of incoming PCI signals into said single incoming MPCI signal in response to one or more of said plurality of incoming PCI signals.

3. The apparatus as recited in claim 2 wherein said multiplexing/demultiplexing stage comprises:

a plurality of incoming multiplexers coupled to said MPCI bus; and an incoming register file coupled to said PCI-to-PCI bridge circuit and configured to receive and buffer one or more of said plurality of incoming PCI signals and to supply said buffered incoming PCI signals to said plurality of incoming multiplexers.

4. The apparatus as recited in claim 2 wherein:

said multiplexing/de-multiplexing stage is further configured to convert said outgoing MPCI transaction as received via said MPCI bus into said outgoing PCI transaction by time-division de-multiplexing at least one of said plurality of outgoing MPCI signals within said outgoing MPCI transaction into said two or more outgoing PCI signals in response to one or more of said plurality of outgoing MPCI signals; and said PCI-to-PCI bridge circuit is further configured to receive said outgoing PCI transaction from said multiplexing/de-multiplexing stage and to output said outgoing PCI transaction on said PCI bus.

5. The apparatus as recited in claim 4 wherein said multiplexing/de-multiplexing stage further comprises:

a plurality of outgoing de-multiplexers coupled to said MPCI bus; and an outgoing register file coupled to said plurality of outgoing de-multiplexers and configured to receive and buffer one or more of said plurality of outgoing PCI signals therefrom and to supply said buffered outgoing PCI signals to said PCI-to-PCI bridge circuit.

6. The apparatus as recited in claim 1 wherein said external device is a MPCI device that is configured to receive said incoming MPCI transactions from said first PCI/MPCI bridge via said MPCI bus, and supply said outgoing MPCI transactions to said first PCI/MPCI bridge via said MPCI bus.

7. The apparatus as recited in claim 1 wherein said external device comprises:

a PCI device; and a second PCI/MPCI bridge coupled to said PCI device and said MPCI bus and configured to convert said incoming MPCI transaction received via said MPCI bus into said incoming PCI transaction which is then supplied to said PCI device, and convert said outgoing PCI transaction received from said PCI device into said outgoing MPCI transaction which is then output onto said MPCI bus.

8. The apparatus as recited in claim 1 wherein said external device is a linearly addressed device coupled directly to said MPCI bus, and wherein said PCI/MPCI bridge provides selective access to said linearly addressed memory device in response to said incoming PCI transaction based on one or more incoming PCI signals.

9. The apparatus as recited in claim 8 wherein said linearly addressed device is accessed via said incoming an outgoing MPCI transactions over said MPCI bus.

10. The apparatus as recited in claim 8 wherein said linearly addressed device is accessed via said incoming and outgoing MPCI transactions over said MPCI bus and via an external data bus.

11. The apparatus as recited in claim 1 further comprising:

a host bus coupled to said CPU; and a chip set coupled between said host bus and said PCI bus, wherein said host bus and said chip set are operatively configured to couple said CPU to said PCI bus.

12. A circuit for coupling one or more external devices to a PCI bus, said circuit comprising:

a PCI-to-PCI bridge capable of being coupled to said PCI bus and configured to send and receive PCI transactions over said PCI bus, wherein each of said PCI transactions includes a plurality of PCI signals which are selected from a group consisting of control signals, address signals and data signals; and a multiplexing/de-multiplexing stage coupled to said PCI-to-PCI bridge and configured to convert at least one of said PCI transactions into at least one MPCI transaction comprising a plurality of MPCI signals, by time-division multiplexing two or more of said plurality of PCI signals into at least one of said plurality of MPCI signals, and to convert said MPCI transactions into at least one PCI transaction, by time-division de-multiplexing one or more of said plurality of MPCI signals to create at least two of said plurality of PCI signals, and wherein said multiplexing/de-multiplexing stage is capable of being coupled to said at least one of said one or more external devices so as to receive MPCI transactions therefrom and send MPCI transactions thereto.

13. The circuit as recited in claim 12 wherein said multiplexing/de-multiplexing stage further comprises a register file coupled to said PCI-to-PCI bridge and operatively configured to temporarily store therein one or more of said plurality of PCI signals as received from said PCI-to-PCI bridge.

14. The circuit as recited in claim 12 wherein said multiplexing/de-multiplexing stage further comprises a register file capable of being coupled to at least one of said one or more external devices and operatively configured to temporarily store one or more of said plurality of PCI signals following conversion from said MPCI transaction to said PCI transaction.

15. The circuit as recited in claim 12 wherein said multiplexing is controlled via one or more of said plurality of said PCI signals, and said de-multiplexing is controlled via one or more of said plurality of said MPCI signals.

16. A method for coupling a PCI bus to one or more external devices, said method comprising:

receiving an incoming PCI transaction from said PCI bus, wherein said incoming PCI transaction includes a plurality of incoming PCI signals selected from a group consisting of control signals, address signals and data signals;

time-division multiplexing at least two of said plurality of incoming PCI signals to generate at least one incoming MPCI signal;

time-division de-multiplexing said incoming MPCI signal to re-generate said at least two of said plurality of incoming PCI signals; and providing said re-generated plurality of incoming PCI signals to said one or more external devices.

17. The method as recited in claim 16 further comprising:

receiving an outgoing PCI transaction from said one or more external devices, wherein said outgoing PCI transaction includes a plurality of outgoing PCI signals selected from a group consisting of control signals, address signals and data signals;

time-division multiplexing at least two of said plurality of outgoing PCI signals to generate at least one outgoing multiplexed MPCI signal;

time-division de-multiplexing said outgoing multiplexed MPCI signal to re-generate said at least two of said plurality of outgoing PCI signals; and providing said re-generated plurality of outgoing PCI signals to said PCI bus.

18. The method as recited in claim 17 wherein said multiplexing is controlled via one or more of said plurality of said outgoing PCI signals, and said de-multiplexing is controlled via one or more non-multiplexed outgoing MPCI signals.

19. The method as recited in claim 17 further comprising temporarily storing one or more of said plurality of said outgoing PCI signals prior to said time-division multiplexing.

20. The method as recited in claim 16 wherein said multiplexing is controlled via one or more of said plurality of said incoming PCI signals, and said de-multiplexing is controlled via one or more non-multiplexed incoming MPCI signals.

21. The method as recited in claim 16 further comprising temporarily storing one or more of said plurality of incoming PCI signals prior to said time-division multiplexing.

22. A means for coupling one or more external devices to a PCI bus, said means comprising:

a bridge means for sending and receiving PCI transactions over said PCI bus; and a conversion means for converting at least one of said PCI transactions into at least one second bus transaction comprising a plurality of second bus signals, by time-division multiplexing two or more of a plurality of PCI signals within said PCI transaction into at least one of said plurality of second bus signals, and converting said second bus transactions into at least one PCI transaction, by time-division de-multiplexing one or more of said plurality of second bus signals to create at least two of said plurality of PCI signals.

* * * * *